United States Patent
Thomas

(10) Patent No.: US 7,917,585 B2
(45) Date of Patent: Mar. 29, 2011

(54) APPARATUS, METHODS AND ARTICLES OF MANUFACTURE FOR INTERCEPTING, EXAMINING AND CONTROLLING CODE, DATA AND FILES AND THEIR TRANSFER

(75) Inventor: Mark G. Thomas, Blue Bell, PA (US)

(73) Assignee: Cybersoft, Inc., Conshohocken, PA (US)

( * ) Notice: Subject to any disclaimer, the term of this patent is extended or adjusted under 35 U.S.C. 154(b) by 444 days.

(21) Appl. No.: 09/886,169

(22) Filed: Jun. 21, 2001

(65) Prior Publication Data

US 2002/0198945 A1   Dec. 26, 2002

(51) Int. Cl.
*G06F 15/16* (2006.01)

(52) U.S. Cl. .......................... 709/206; 726/24

(58) Field of Classification Search ................ 709/246, 709/206, 101, 229; 707/10, 104.1; 706/47; 726/24, 22; 713/151, 164, 154, 200; 370/394; 714/38; 455/412.1; 715/56
See application file for complete search history.

(56) References Cited

U.S. PATENT DOCUMENTS

| | | | | |
|---|---|---|---|---|
| 5,740,231 A * | 4/1998 | Cohn et al. | ................ | 709/206 |
| 5,837,162 A * | 11/1998 | Reiffenrath et al. | ..... | 252/299.63 |
| 5,889,943 A * | 3/1999 | Ji et al. | ................ | 726/22 |
| 5,951,698 A * | 9/1999 | Chen et al. | ................ | 714/38 |
| 5,999,932 A * | 12/1999 | Paul | ................ | 709/206 |
| 6,072,942 A * | 6/2000 | Stockwell et al. | ............ | 709/206 |
| 6,321,267 B1 * | 11/2001 | Donaldson | ................ | 709/229 |
| 6,381,242 B1 * | 4/2002 | Maher et al. | ................ | 370/394 |
| 6,453,339 B1 * | 9/2002 | Schultz et al. | ................ | 709/206 |
| 6,460,050 B1 * | 10/2002 | Pace et al. | ................ | 707/104.1 |
| 6,493,696 B1 * | 12/2002 | Chazin | ................ | 706/47 |
| 6,609,196 B1 * | 8/2003 | Dickinson et al. | ............ | 713/154 |
| 6,650,890 B1 * | 11/2003 | Irlam et al. | ................ | 455/412.1 |
| 6,654,787 B1 * | 11/2003 | Aronson et al. | ............. | 709/206 |
| 6,701,440 B1 * | 3/2004 | Kim et al. | ................ | 726/24 |
| 6,802,012 B1 * | 10/2004 | Smithson et al. | ............... | 726/24 |
| 6,941,304 B2 * | 9/2005 | Gainey et al. | ................ | 707/10 |
| 6,941,478 B2 * | 9/2005 | Card et al. | ................ | 713/164 |
| 6,973,578 B1 * | 12/2005 | McIchionc | ................ | 726/24 |
| 7,020,895 B2 * | 3/2006 | Albrecht | ................ | 726/22 |
| 7,131,070 B1 * | 10/2006 | Motoyama et al. | ............ | 715/745 |
| 2002/0112008 A1 * | 8/2002 | Christenson et al. | ......... | 709/206 |
| 2002/0147780 A1 * | 10/2002 | Liu et al. | ................ | 709/206 |
| 2002/0199095 A1 * | 12/2002 | Bandini et al. | ................ | 713/151 |
| 2003/0009526 A1 * | 1/2003 | Bellegarda et al. | ............ | 709/206 |
| 2003/0028580 A1 * | 2/2003 | Kucherawy | ................ | 709/101 |
| 2003/0191957 A1 * | 10/2003 | Hypponen et al. | ............ | 713/200 |

* cited by examiner

*Primary Examiner* — Dustin Nguyen

(74) *Attorney, Agent, or Firm* — John F. A. Earley, III; Frank J. Bonini, Jr.; Harding, Earley, Follmer & Frailey, P.C.

(57) ABSTRACT

Apparatus, methods, and articles of manufacture are claimed for processing stored and forwarded code comprising the transferring of the stored and forwarded code from a storage area to a transfer component, wherein the code is passed to a proscribed code scanner. The proscribed code seamier indicates the presence or absence of proscribed code, which may be a virus, confidential material, harassing material, etc. and provides the indication back to the transfer component, wherein the code may be quarantined or otherwise intercepted depending upon the results of the scan. The especially preferred embodiments operate within a UNIX sendmail environment.

23 Claims, 3 Drawing Sheets

APPARATUS, METHODS AND ARTICLES OF MANUFACTURE FOR INTERCEPTING, EXAMINING AND CONTROLLING CODE, DATA AND FILES AND THEIR TRANSFER

FIELD OF THE INVENTION

The present invention relates to apparatus, methods and articles of manufacture for intercepting, examining and controlling code, data and files and their transfer. More particularly, the present invention relates to apparatus, methods and articles of manufacture for intercepting, examining and controlling proscribed or predetermined code, data and files and their transfers.

BACKGROUND OF THE INVENTION

The rise of the Internet and networking technologies has resulted in the widespread transfer of code, data and files between computers. This material is not always what it seems to be. For example, code that is accessed on a remote machine and downloaded to a computer system can contain hostile algorithms that can potentially destroy code, crash the system, corrupt code or worse. Some of these hostile algorithms are viruses, worms, and Trojan horses.

Hostile, malicious and/or proscribed code, data and files ("code" as used hereinafter generally includes "data" and "files") can infect a single computer system or entire network and so posit a security risk to the computer system or network. The user and/or administrator (generally referred to hereinafter as "user") may wish to intercept, examine and/or control such code. The user might also wish to intercept, examine and/or control other code as well, for example, code which the user does not know to be hostile, but wishes to intercept nonetheless, for example, potentially sexually or racially harassing email, junk email, trade secret text, or other confidential information, etc. This latter type of code is known hereinafter as "predetermined code".

Antivirus or other similar packages attempt to protect the system or network from hostile, malicious, predetermined and/or proscribed code (generally referred to hereinafter as "proscribed code.") VFIND®, from CyberSoft, Inc., is one such product that may protect systems and networks from proscribed code. If the virus programs are not run frequently—an all too common occurrence—they will not protect the system. Therefore, the benefits and protections offered by antivirus programs are often lost.

The difficulty of scanning code or proscribed code is accentuated by email. Email, providing a simple and convenient method of transferring code, is often only scanned after receipt, at the user's option. If the user does not scan the email, or improperly scans the email, proscribed code might infect the system. Moreover, programs often used to send and receive email, such as Microsoft Outlook®, may open the email automatically and thus permit proscribed code to infect the system without any user interaction whatsoever. In such a situation, the user may not even realize his or her system is infected until too late—after the infection by the proscribed code.

Moreover, a primary method of detecting viruses and other hostile code is by examining the code only after it has entered the user's machine. This method may provide some protection however the virus may still be on the user's machine and available to the network.

Therefore, it would be beneficial to have apparatus, methods and articles of manufacture for simply and effectively scanning email in an efficient manner transparently or almost transparently to the end-user, with little or no operational effort required by the user.

Accordingly, it is an object of the present invention to provide apparatus, methods and articles of manufacture that simply and effectively intercept, control, and/or examine incoming and outgoing code in an efficient manner transparently or almost transparently to the end-user, with little or no operational effort required by the user.

It is a further object of the present invention to provide apparatus, methods and articles of manufacture that simply and effectively intercept, control, and/or examine incoming and outgoing code transferred, at least in part, through a "store and forward" transfer system, in an efficient manner transparently or almost transparently to the end-user, with little or no operational effort required by the user.

It is a further object of the present invention to provide apparatus, methods and articles of manufacture that simply and effectively intercept, control, and/or examine incoming and outgoing code transferred, at least in part, through a "store and forward" transfer system, in an efficient manner transparently or almost transparently to the end-user, with little or no operational effort required by the user.

SUMMARY OF THE INVENTION

The present invention comprises apparatus, methods and articles of manufacture for intercepting, examining, and/or controlling code transferred, at least in part, through a "store and forward" system (hereinafter "stored and forwarded code.") The present invention may operate on a single computer system, network, or multiple systems or networks as desired.

The present invention may, in various embodiments, process, that is, intercept, examine, and/or control, any or all stored and forwarded code in a computer or network. Intercepting, examining and/or controlling stored and forwarded code includes but is not limited to sorting, altering, monitoring, blocking, logging, quarantining, discarding, redirecting and/or transferring code. Although the present invention can be implemented on various platforms, the preferred embodiments are used in Unix® and various Windows® environments, such as NT, 2000, 95, 98 and Me.

The especially preferred embodiments of the present invention process stored and forwarded email. Email is usually stored and forwarded through a queue, and the especially preferred embodiments create a new, secondary queue prior to further sendmail processing. A transfer component retrieves the messages from the queue and delivers them in turn to a proscribed code scanner prior to further sendmail processing. For example, in Unix® environments using sendmail, the preferred embodiments will create at least one new, secondary queue and transfer messages to that secondary queue by way of a transfer component, as the messages are scanned for proscribed code using a proscribed code scanner. If any particular message contains proscribed code, the message could be altered, blocked, logged, etc. In the preferred embodiments, the messages containing proscribed code are placed in another new, secondary queue, and the user or administrator could be notified, or not, as desired.

Additionally, preferred embodiments may have more than one level of transfer component or be "multilevel." In such a multilevel embodiment a primary transfer component transfers messages to second level transfer components based on one or more parameters such as size of the message, etc.

DETAILED DESCRIPTION OF THE PREFERRED EMBODIMENTS

Figure 1:
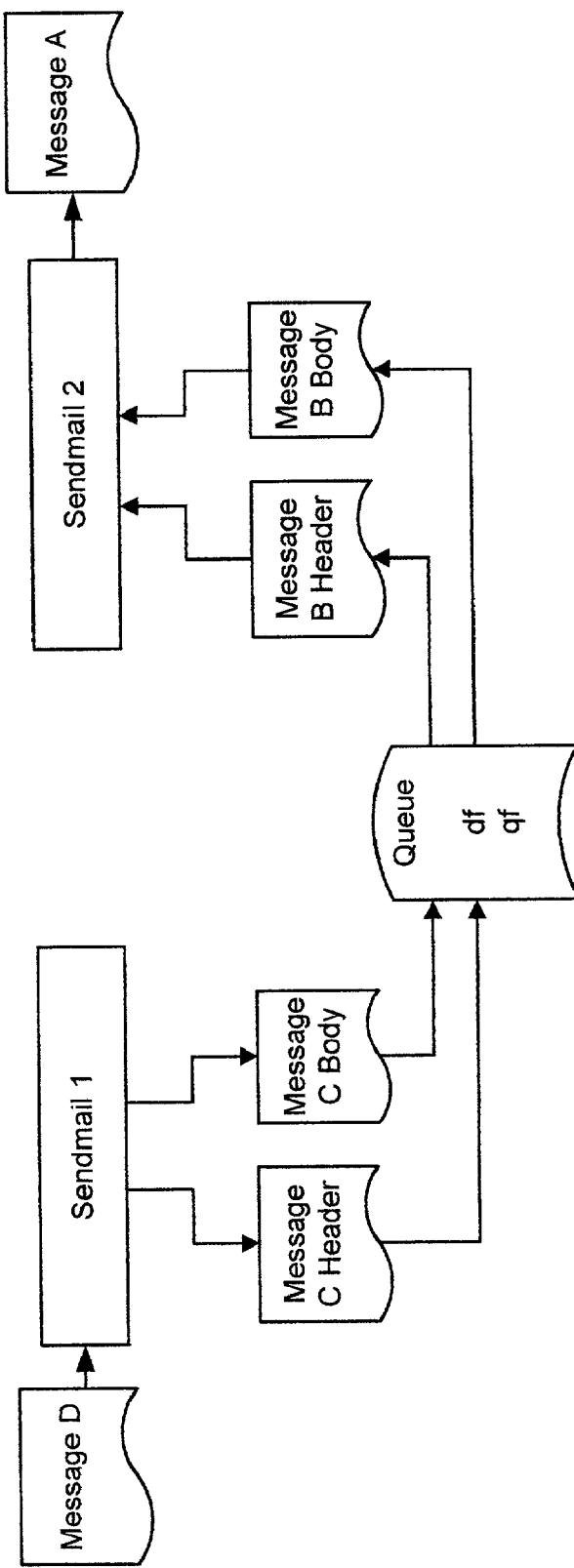
FIG. 1 is a schematic diagram of the operation of sendmail.

The present invention comprises apparatus, methods and articles of manufacture for intercepting, examining, and/or controlling code transferred, at least in part, through a "store and forward" system. In a stored and forwarded system, code is stored or queued (also referred to herein as "intermediate storage") at some point along the transmission, and then forwarded to the recipient. A stored and forwarded system may maintain its intermediate storage in a number of ways or components. For example, storage components may be located in memory, on disk, on another system, etc. Storage or queuing is used for a number of reasons: for example, if the transmission pathway is blocked or the destination is unreachable, a queue may maintain the messages for some period of time, in order to try transmitting the message again.

The preferred embodiments process, that is, intercept, examine, and/or control, stored and forwarded code, including email, other message code, and other stored and forwarded code. "Stored and forwarded code" is defined herein as discrete units of code, stored and forwarded as those discrete units.

The stored and forwarded code processed by the embodiments of the present invention may be transferred through any number of connections in a computer system, systems, network or networks. Processing code, that is, intercepting, examining and/or controlling code, includes but is not limited to sorting, altering, monitoring, blocking, logging, quarantining, discarding, redirecting and/or transferring email.

An especially preferred embodiment of the present invention runs on a Unix® platform with sendmail such as System V, Sun Solaris®, IBM AIX®, HP-UX®, etc. The following description of the preferred embodiments uses Sun Solaris® operating system Unix® terminology. However, it should be specifically understood that embodiments can be implemented in other Unix® and Unix®-like platforms, including but not limited to Linux® and its variants, as well as other operating system platforms including but not limited to Microsoft Windows® NT, Windows® 2000, Windows® 95, 98 and Me, IBM MVS, IBM OS/390, SNA, 3270 RJE, MacOS, VxWorks® and others. Moreover, embodiments of the present invention may be used in cross platform situations, such as for example, in a network using SMTP to transfer messages, or for example, in an enterprise running IBM's MQSeries of products which provides, inter alia, enterprise-wide messaging capabilities using store and forward technology.

The preferred embodiments are written in UNIX Bourne shell script, with components written in other languages, although any language known in the art may be used.

In typical email technology, the user has a mail user interface or mail user agent (MUA) to compose, read and send email. The MUA transmits the email from the user to a mail transport agent (MTA.) The MTA then makes routing and delivery decisions, transmits the email between machines, etc.

Sendmail is a common MTA in UNIX environments. Before turning to the especially preferred embodiments operating with sendmail, it would be helpful to review the operation of sendmail. Sendmail is a group of programs, files, directories and services installed on a user's mail processing machine. (Typically, most UNIX machines are connected in a network, and one of the networked machines functions as a mail processing machine for the network users.)

In typical operation, sendmail receives email from another source or sources and passes it to the user or users. One of the components used by sendmail to accomplish this function is a queue which holds mail until it can be delivered. The queue is a directory, usually on the mail processing machine. The queue stores outgoing messages, i.e., those messages to be sent to other users; as well as incoming messages, i.e., those messages sent from other users.

A message stored in the queue is comprised of two primary parts: a message header containing the address and other "envelope" or routing and delivery information; as well as a message body, or the actual message material. The message header and message body are stored in separate files in the queue directory. Additionally, other related files may be stored in the queue directory, such as lock files which are used to insure message integrity. The queue directory is usually called mqueue. Sendmail's Queue directory addresses and other parameters are modified through various configuration variables invoked by command line options, or by changes to a sendmail configuration file.

Once initiated, sendmail usually resides as a daemon on the system, listening on the appropriate connection (usually port 25) for message transmission. When an incoming message is detected, sendmail will fork one or more children, which will then store and forward the email.

Turning now to FIG. 1, an example of a sendmail process is seen. Sendmail 1 receives the incoming message, such as Message D, and separates the messages it receives into message headers and message bodies, such as Message C Header and Message C Body. These are stored in the queue directory in two files, called in this example qf and df, respectively. Sendmail then forks a sendmail child process, Sendmail 2, then initiates a TCP/IP connection to the next destination for the message (which may be another user's MUA, another MTA, etc.) ensures the recipient's address exists, removes the message from the queue, reassembles the message (identified as Message B Header and Message B Body) and delivers the message (identified as Message A.)

Figure 2:
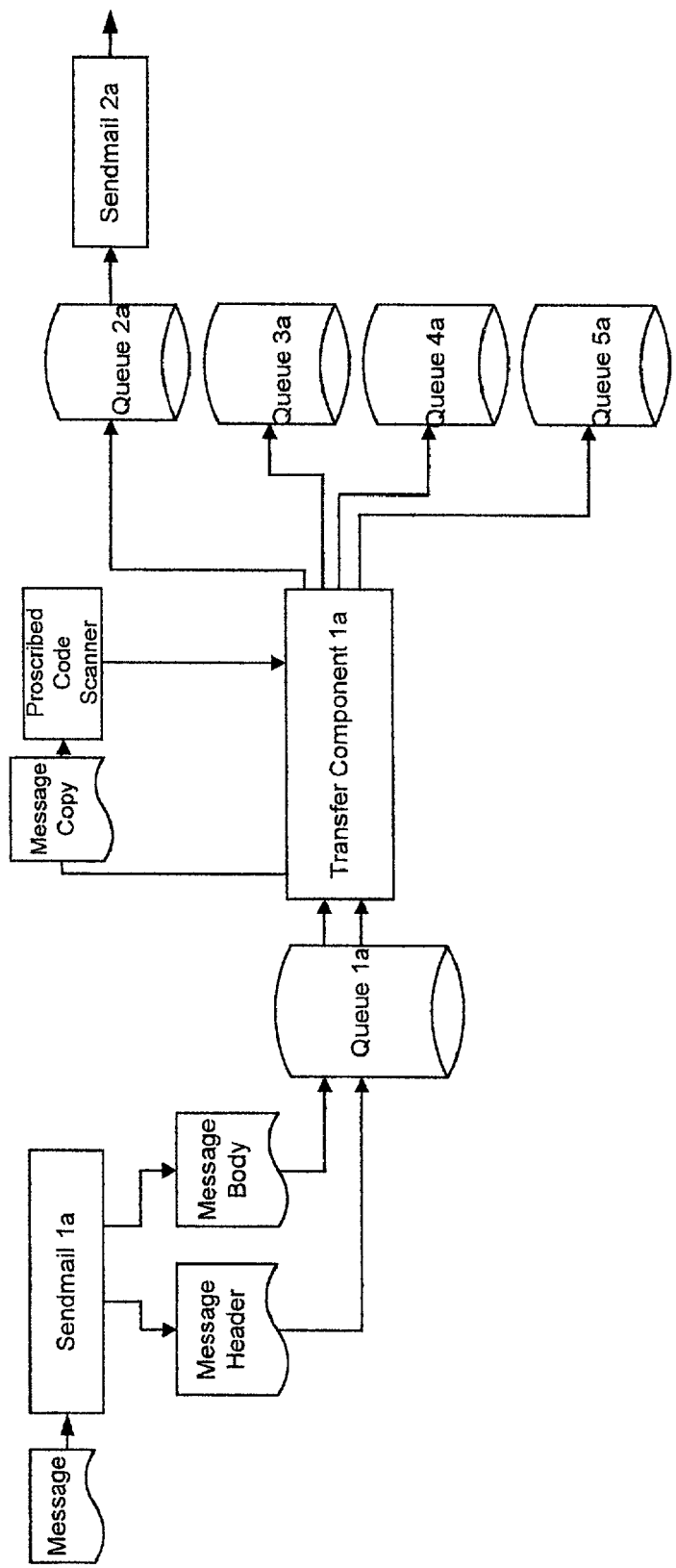
FIG. 2 is a schematic diagram of a preferred embodiment of the present invention.

The preferred embodiments implement proscribed code scanning of the messages stored in a queue. Turning now to FIG. 2, a schematic diagram of the especially preferred embodiment is shown. In this embodiment, a single machine is serving as the mail hub. The machine has sendmail installed and the sendmail queue has been created. The embodiment comprises a transfer component, a proscribed code scanner, and four secondary storage components, or queue directories.

It is important to note that the number of secondary storage components or queue directories used in any particular embodiment is as desired: for example an embodiment might comprise a transfer component, a proscribed code scanner, and one secondary queue directory. It might usually be advantageous to use a secondary queue for secondary storage components that is the same type as a first storage component, for example, in a sendmail embodiment it would usually be advantageous to construct a secondary sendmail queue because a sendmail delivery process could be fairly easily configured to pick up mail from that secondary queue. However, it should be noted that embodiments may use any type or number of secondary storage components, or dispense with a secondary stored component entirely. For example, preferred embodiments might use some type or number of secondary storage component or components, use no secondary stored component by transferring code directly to a subsequent messaging or other application, etc.

In the preferred embodiments, the secondary queue or queues used may be created upon installation or startup, as desired. Sendmail 2a has also been modified to point to Queue 2a for outgoing messages rather than the original Queue 1. The specific port is as desired, however, care should be taken to insure that the port chosen is not being used by other applications. This modification in this embodiment was accomplished by way of a command line, although other methods of modification are possible such as to a sendmail configuration file, etc.

In this embodiment, sendmail forks a child process Sendmail 1a when it detects an incoming message. Sendmail 1a parses the message into header and body, and those header and body components are stored in Queue 1a. Copies of the header and body components are then made by Transfer Component 1a, reassembled into the message and passed to Proscribed Code Scanner.

In some embodiments, code information, e.g. location information, directory information, etc., rather than or in addition to code or copies of code might be transferred. The transfer of this information allows for subsequent operations in these embodiments, e.g., proscribed code scanning, etc. Therefore the word "transfer" as used herein with regard to code or messages is intended to encompass transfer of code, copies of code and code information, any and/or all of which can be used in the various embodiments of the present invention.

After Proscribed Code Scanner scans the message for proscribed code, it returns an indicator of the result of the scan to Transfer Component 1a. This proscribed code indicator may take many forms: e.g. whether the content is acceptable, that is, has no proscribed code; whether the message is virus infected; whether the message is merely spam, etc. Transfer Component 1a moves the header and body components to the appropriate queues, (Queue 2a, Queue 3a, Queue 4a or Queue 5a) based on the indication from the Proscribed Code Scanner as described above.

In especially preferred embodiments, a proscribed code scanner and transfer component are able to communicate in order to assist the process. For example, a transfer component might well use the same or similar flags or other indicators of a proscribed code scanner if the proscribed code scanner is a self-contained engine, such as VFIND® by CyberSoft, Inc. This type of information exchange would be also helpful in a number of other ways, for example, to interrogate a proscribed code scanner in order to understand the scanner's messaging processing status, etc.

Returning now to the embodiment of FIG. 2, each secondary queue contains a different category of messages or attachments after processing by proscribed code scanner; secondary queue directory Queue 2a contains messages that have passed the scanning and may now be processed by Sendmail 2a accordingly; secondary queue directory Queue 3a contains messages that are infected by a virus; secondary queue directory Queue 4a contains messages that qualify as junk mail or spam; and, secondary director, Queue 5a contains messages that contain confidential material that is not to be sent by email. In other embodiments there may be more or fewer secondary queue directories, as desired, containing any sort of code categories. For example, one embodiment of the present invention may sort mail, or other stored and forwarded code, into categories, for example by size. The number of secondary queue directories in this type of embodiment could then depend upon message sizes, with different sizes being placed into different secondary queues. Such an arrangement would assist in preventing message lag, wherein large messages would take more time to pass through the system and so block smaller messages. By placing larger messages into a secondary queue or queues separate from the secondary queues of smaller messages, the smaller messages could proceed through the system more quickly.

In some preferred embodiments, the message header provides information to be used for decisions by a transfer component. For example, an embodiment may implement a number of proscribed code scanners, each with different settings for scanning different code. Messages may be sent to a particular scanner by a transfer component according to header information, i.e., a previously untrustworthy header might sent to a virus proscribed code scanner, etc. Of course a header indicating spam might be sent directly to a queue in certain embodiments, without going through a proscribed code scanner first.

Of course, as discussed above, other embodiments may use other arrangements and other numbers of secondary queues as desired. As an example, if a store and forward process uses more than one original queue, more than one secondary queue may be created.

Returning now to the embodiment of FIG. 2, once the messages are stored in the secondary queues, those in Queue 2a will be processed by Sendmail 2a for subsequent delivery. The messages stored in the other secondary queues may be disposed of, modified, stripped of offending material, etc. or otherwise treated in any manner as desired. For example, the infected messages and/or attachments may be brought to the user, administrators, or another's attention. As should be clear, any type of stored and forwarded code may be intercepted, examined, and/or controlled according to the embodiments of the present invention. In some embodiments, for example, the proscribed code scanner may be reviewing the code for sexually or racially harassing material, for corporate trade secrets, or for any other predetermined code. Additionally, in various embodiments, the transfer component may itself classify code according to various parameters as mentioned above.

Figure 3:
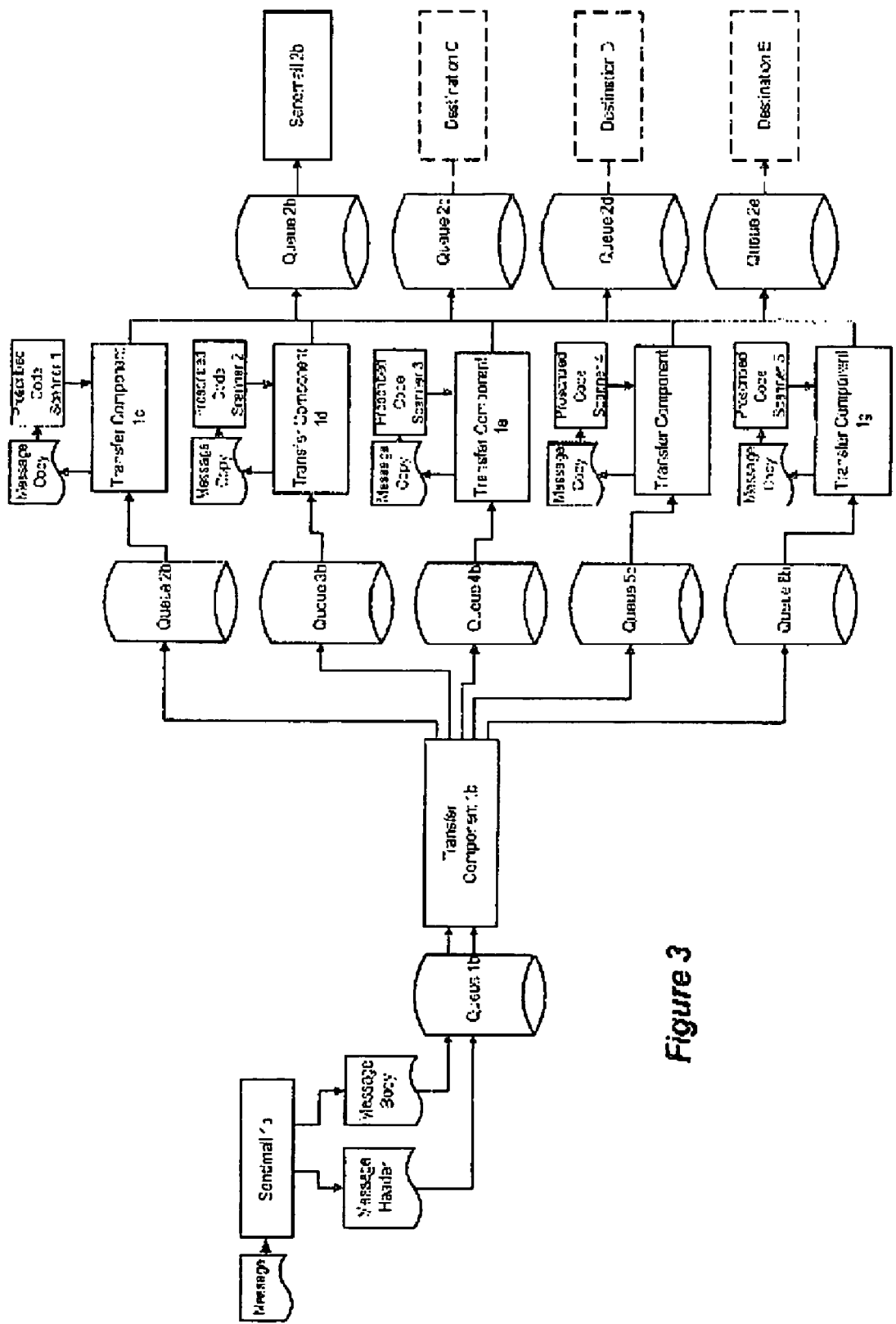
FIG. 3 is a schematic diagram of another preferred embodiment of the present invention.

Turning now to FIG. 3 another preferred embodiment, one with numerous transfer components, is seen. In this embodiment there are a number of transfer components: Transfer Component 1b or a primary transfer component; and secondary transfer components, 1c, 1d, 1e, 1f and 1g. This embodiment, and other multiple transfer component embodiments which generally use one or more primary transfer components to feed one or more other secondary and possibly other level transfer components, would be especially useful in a number of circumstances. For example, multiple transfer component embodiments might be used for load distribution, resource and/or processor management in single or multiple processor system, systems, network or networks.

Transfer Component 1b has no associated proscribed code scanner. Rather, Transfer Component 1b scans the messages in Queue 1b and delivers them to various secondary queues according to size. This process helps insure that larger messages are reviewed appropriately while permitting smaller messages to proceed around the larger messages thus minimizing chances of a stalled system or process. In this embodiment, Queue 2b receives the largest messages, Queue 6b the smallest, and the remaining Queues take various other sizes. The exact size demarcations are as desired, and may be dependent on any of a number of factors such as type of system in which the embodiment is installed, type of messages passing through the embodiment, etc. Other embodiments might deliver messages according to other parameters such as message lag time (length of time message has been in the system,) etc.

Returning to FIG. 3, messages are sent by Transfer Component 1b to the appropriate size differentiated queue. The secondary Transfer Components associated with the queue then reviews the code for proscribed code byway of a proscribed code scanner, in a process like that described above with regard to FIG. 2. In the embodiment of FIG. 3 and other preferred embodiments, each Transfer Component has an associated Proscribed Code Scanner. In other embodiments, there may be a different ratio of Proscribed Code Scanners to Transfer Components.

The message is then routed appropriately, according to the outcome of the proscribed code scan, into an appropriate Queue for final disposition. For example, in the embodiment shown in FIG. 3, mail that has passed the scan is sent to Queue 2b, for routing and delivery by Sendmail 2b.

It should be noted that, in the various embodiments of the present invention, stored and forwarded code may be routed, or not, as desired, from a secondary storage component. For example, in the embodiment of FIG. 3 dotted lines show various possible destination for the code retained in the various secondary queues. For example, Destination C could be a storage area on the administrator's machine, Destination D a storage area on a file server, Destination E a storage area on an antivirus manufacturer's network, etc. Additionally, monitoring and/or, communication components might be used in various embodiments, such as, for example, monitoring the status of transfer components, message flow through the system, the number of virus files, communication of status or other information between components, etc. Any monitoring components added to various embodiments may be added to a number of components, such as a transfix components, a proscribed code scanner, a secondary storage component, etc. and may include logging and/or other reporting components, such as notification components.

In some embodiments, code transfer might be on any batch or other basis, such as through a specific number of messages on a regular cycle, etc. For example, some specific number of messages, such as 20, might be processed at regular intervals. In other embodiments, stream processing might occur. For example, one especially preferred embodiment passes messages from a transfer component to a proscribed code scanner, and, as the transfer component receives proscribed code indications from the scanner, the component passes the messages to a secondary queue for immediate delivery by a sendmail or other mail process.

In some embodiments, a secondary storage component need not be present. For example, embodiments may transfer code directly to a sendmail process or other transfer agent or component. These embodiments may use known API's or other EDI's as known in the art.

In alternate embodiments, the invention comprises an article of manufacture, or signal-bearing medium, containing computer readable code. Examples of such articles include tarred code and other types and/or methods of storing, archiving and/or compressing code known in the art, contained on any media known in the art, such as CD-ROM's, floppy disks, etc.

The above description and the views and material depicted by the figures are for purposes of illustration only and are not intended to be, and should not be construed as, limitations on the invention. Moreover, certain modifications or alternatives may suggest themselves to those skilled in the art upon reading of this specification, all of which are intended to be within the spirit and scope of the present invention as defined in the attached claims.

I claim:

1. A method for processing stored and forwarded code comprising: providing a computer with a storage component, transferring code, from said storage component, to a transfer component; transferring said code, from said transfer component, to a proscribed code scanner including exchanging information between said transfer component and said proscribed code scanner whereby said transfer component interrogates said proscribed code scanner to obtain processing status information; providing an indicator via said proscribed code scanner and indicating, via said proscribed code scanner returning said indicator to said transfer component, whether said code contains proscribed code; and, without transmitting said code that was transferred to the proscribed code scanner for analysis to said transfer component; and transferring said code to at least one secondary storage component based on said indication;
    wherein said transfer component is configured with instructions to implement transfer of code directly to at least one secondary storage component without transferring code to the proscribed code scanner when said transfer component recognizes information contained in said code that the transfer component uses to make a decision, and
    wherein the method includes transferring code directly to at least one secondary storage component without transferring code to the proscribed code scanner when said transfer component recognizes information contained in said code to correspond with a proscribed code scanner status for that code.

2. A method as in claim 1 further comprising the step of transferring said code from said at least one secondary storage component to a subsequent code transfer component.

3. A method as in claim 1 further comprising the step of sorting said code prior to transfer to said at least one secondary storage component.

4. A method as in claim 3 further comprising the step of transferring code to at least two secondary storage components, with a first of at least two secondary storage components receiving smaller stored and forwarded code and a second of at least two secondary storage components receiving larger stored and forwarded code.

5. A method as in claim 1 wherein said code comprises email.

6. A method for processing stored and forwarded code comprising: providing a computer with a storage component, transferring code, from said storage component, to a first transfer component; sorting said code; transferring said code, based on the results of said sort, to at least one first secondary storage component; transferring said code from at least one first secondary storage component to at least one secondary transfer component; transferring said code, from said at least one first secondary transfer component to a proscribed code scanner; indicating, via said proscribed code scanner to said at least one first transfer component, whether said code contains proscribed code, without transmitting said code to said transfer component; and, transferring said code from at least one first secondary transfer component to at least one second secondary storage component based on said indication;
    wherein said transfer component is configured with instructions to implement transfer of code directly to at least one secondary storage component without transferring code to the proscribed code scanner when said transfer component recognizes information contained in said code that the transfer component uses to make a decision, and wherein the method includes transferring code directly to at least one secondary storage component without transferring code to the proscribed code scanner when said transfer component recognizes information contained in said code to correspond with a proscribed code scanner status for that code.

7. A method as in claim 6 further comprising the step of transferring said code from said at least one secondary storage component to a subsequent code transfer component.

8. A method as in claim 6 wherein the step of sorting said code further comprises sorting the code by size.

9. A method as in claim 6 wherein said code comprises email.

10. A method for processing stored and forwarded email, using sendmail, comprising: providing a computer with a storage component, transferring email, from a sendmail queue, to a transfer component; transferring email, from said transfer component, to a proscribed code scanner; indicating, via said proscribed code scanner to said transfer component, whether said email contains proscribed code, without transmitting said code to said transfer component; and, transferring said email to at least one secondary sendmail queue based on said indication;

wherein said transfer component is configured with instructions to implement transfer of code directly to at least one secondary sendmail queue without transferring code to the proscribed code scanner when said transfer component recognizes information contained in said code that the transfer component uses to make a decision, and wherein the method includes transferring code directly to at least one secondary sendmail queue without transferring code to the proscribed code scanner when said transfer component recognizes information contained in said code to correspond with a proscribed code scanner status for that code.

11. A method as in claim 10 further comprising the step of transferring said email from said at least one secondary sendmail queue to a subsequent sendmail process.

12. A method as in claim 10 further comprising the step of sorting said email prior to transfer to said at least one secondary sendmail queue.

13. A method as in claim 10, further comprising the step of sorting said code prior to transfer to said at least one secondary storage component, wherein the step of sorting said email prior to transfer to said at least one secondary sendmail queue component further comprises sorting the email by size.

14. An computerized apparatus for processing stored and forwarded code comprising: a storage component; a transfer component; a proscribed code scanner; and, a first and a second secondary storage component; wherein code, stored in said storage component, is transferred to said transfer component, and therefrom transferred to said proscribed code scanner, which, after scanning said code, indicates to said transfer component as to the presence of proscribed code, without transmitting said code to said transfer component; and said transfer component transfers said code to either said first or second secondary storage component based upon the presence or absence of proscribed code as indicated by said proscribed code scanner;

wherein the apparatus is configured with instructions to implement the transfer of code from the transfer component directly to at least one of said first and second secondary storage components without transferring code to the proscribed code scanner when said transfer component recognizes information contained in said code that the transfer component uses to make a decision.

15. An apparatus as in claim 14 wherein said code comprises email.

16. An apparatus as in claim 14 wherein said storage component is a sendmail queue.

17. A computerized apparatus for processing stored and forwarded email, using sendmail, comprising: storage means for storing code; a sendmail queue; a transfer component; a proscribed code scanner; and, a first and a second secondary storage component; wherein said storage means is configured with instructions stored therein to implement a transfer of email, stored in said sendmail queue, to said transfer component, and from said transfer component to said proscribed code scanner, said proscribed code scanner being configured to scan said email and after scanning said email, to indicate to said transfer component as to the presence of proscribed code, without transmitting said code to said transfer component, and wherein said transfer component is configured with instructions to implement transfer of said code to either said first or second secondary sendmail queue based upon the presence or absence of proscribed code as indicated by said proscribed code scanner;

wherein the apparatus is configured with instructions to implement the transfer of code from the transfer component directly to at least one of said first or second secondary sendmail queue without transferring code to the proscribed code scanner when said transfer component recognizes information contained to said code that the transfer component uses to make a decision.

18. An article of manufacture comprising: a computer-readable storage medium; storage means in the medium for storing code; said computer readable storage medium being configured with instructions stored therein that when processed with a processor transfers with transfer component said stored code stored in said storage means; to a proscribed code scanner; scans with said proscribed code scanner means for scanning said code for proscribed code and indicates with said proscribed code scanner means to said transfer component whether said code contains proscribed code, without transmitting said code to said transfer component; and, a first and second secondary storage means in the medium for storing said code based upon the presence or absence of proscribed code as indicated by said proscribed code scanner means;

said computer readable storage medium being configured with instructions to implement exchanging information between said transfer component and said proscribed code scanner means whereby said transfer component interrogates said proscribed code scanner means to obtain processing status information; said computer readable storage media being configured with instructions for providing an indicator via said proscribed code scanner means and indicating, via said proscribed code scanner means returning said indicator to said transfer component, whether said code contains proscribed code; and, without transmitting said code that was transferred to the proscribed code scanner for analysis to said transfer component; said computer readable storage medium being configured with instructions to transfer said code to at least one secondary storage component based on said indication;

wherein said transfer component is configured with instructions to implement transfer of code directly to at least one secondary storage component without transferring code to the proscribed code scanner when said transfer component recognizes information contained in said code that the transfer component uses to make a decision; and wherein said computer readable storage medium being configured with instructions that implement the transfer of code directly to at least one secondary storage component without transferring code to the proscribed code scanner when said transfer component recognizes information contained in said code to correspond with a proscribed code scanner status for that code.

19. A method for processing stored and forwarded code comprising:

providing a computer with a storage component;

transferring code, from a storage component, to a first transfer component;

sorting said code;

transferring said code, based on the results of said sort, to at least one first secondary storage component; transferring said code from at least one first secondary storage component to at least one first secondary transfer component;

transferring said code, from said at least one first secondary transfer component to a proscribed code scanner;

indicating, via said proscribed code scanner to said at least one first transfer component, whether said code contains proscribed code, without transmitting said code to said at least one first transfer component, including exchanging information between said transfer component and said proscribed code scanner whereby said transfer component interrogates said proscribed code scanner to obtain processing status information; and, transferring said code from at least one first secondary transfer component to at least one second secondary storage component based on said indication, wherein at least a plurality of secondary storage components are provided, including at least one secondary storage component comprising a queue for outgoing messages, and wherein at least one other of said queue comprises a queue from which messages are copied by a said transfer component and said copies are transferred to said proscribed code scanner, wherein said code comprises email, and wherein the method includes the step of creating a secondary queue.

20. The method of claim 9, wherein the method comprises a method for sending mail using a mail transport agent, including creating a secondary queue which comprises a new queue prior to processing by said mail transport agent, and retrieving email code from the second queue prior to further processing by said mail transport agent and delivering prior to further processing by said mail transport agent said retrieved email code to a proscribed code scanner.

21. The method of claim 20, wherein where scanning of said email code delivered to said proscribed code scanner results in the identification of the presence of proscribed code the email code may remain in the secondary queue or be transferred to a second secondary queue, and wherein when scanning of said email code delivered to said proscribed code scanner does not result in the identification of the presence of proscribed code, the email code is be moved to one or more third secondary queues.

22. The method of claim 1, wherein at least a plurality of secondary storage components are provided, including at least one secondary storage component comprising a queue for outgoing messages, and wherein at least one other of said queue comprises a queue from which messages are copied by a said transfer component and said copies are transferred to said proscribed code scanner.

23. The method of claim 1, wherein said code contains header information and wherein when said transfer component transfers code directly to at least one secondary storage component without transferring code to the proscribed code scanner when said transfer component recognizes information contained in said code to correspond with a proscribed code scanner status for that code, said transfer component recognition is based on said header information.

* * * * *